(12) United States Patent
Tang et al.

(10) Patent No.: US 8,964,323 B1
(45) Date of Patent: *Feb. 24, 2015

(54) SYSTEM AND METHOD FOR DETECTING AND CORRECTING SHIFT IN A DC LEVEL OF AN INPUT SIGNAL

(71) Applicant: Marvell International Ltd., Hamilton (BM)

(72) Inventors: Heng Tang, San Jose, CA (US); Yu-Yao Chang, Sunnyvale, CA (US); Panu Chaichanavong, Sunnyvale, CA (US); Michael Madden, Mountain View, CA (US); Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,111

(22) Filed: May 19, 2014

Related U.S. Application Data

(63) Continuation of application No. 13/683,638, filed on Nov. 21, 2012, now Pat. No. 8,730,609.

(60) Provisional application No. 61/622,271, filed on Apr. 10, 2012, provisional application No. 61/563,003, filed on Nov. 22, 2011.

(51) Int. Cl.
*G11B 5/09* (2006.01)
*G11B 5/02* (2006.01)
*G11B 20/10* (2006.01)

(52) U.S. Cl.
CPC .............................. *G11B 20/10203* (2013.01)
USPC ............................................... 360/46; 360/25

(58) Field of Classification Search
None
See application file for complete search history.

(56) References Cited

U.S. PATENT DOCUMENTS

| | | | | |
|---|---|---|---|---|
| 7,231,001 B2 * | 6/2007 | Aziz | ............................. | 375/319 |
| 7,305,027 B2 * | 12/2007 | Chang et al. | ................... | 375/232 |
| 8,139,457 B2 * | 3/2012 | Cao et al. | .................... | 369/53.16 |
| 8,406,351 B1 * | 3/2013 | Altekar | ......................... | 375/341 |
| 8,461,896 B2 * | 6/2013 | Zhuang | ......................... | 327/307 |

* cited by examiner

*Primary Examiner* — Regina N Holder

(57) ABSTRACT

A system including a first filter module configured to receive an input signal including (i) a first shift in a DC level of the input signal and (ii) a second shift in the DC level of the input signal. The first shift has (i) a first magnitude and (ii) a first duration. The second shift has (i) a second magnitude and (ii) a second duration. The second magnitude is different than the first magnitude. The second duration is greater than the first duration. The first filter module is configured to pass the first shift. The second filter module is configured to detect one or more of (i) the first shift and (ii) the second shift, and in response to detecting one or more of (i) the first shift and (ii) the second shift, filter one or more of (i) the first shift and (ii) the second shift.

20 Claims, 12 Drawing Sheets

SYSTEM AND METHOD FOR DETECTING AND CORRECTING SHIFT IN A DC LEVEL OF AN INPUT SIGNAL

CROSS-REFERENCE TO RELATED APPLICATIONS

The present disclosure is a continuation of U.S. patent application Ser. No. 13/683,638 (now U.S. Pat. No. 8,730,609), filed on Nov. 21, 2012, which claims the benefit of U.S. Provisional Application No. 61/563,003, filed on Nov. 22, 2011 and U.S. Provisional Application No. 61,622,271, filed Apr. 10, 2012. The entire disclosures of the applications referenced above are incorporated herein by reference.

FIELD

The present disclosure relates generally to storage devices and more particularly to detecting and correcting DC shift in signals generated by read/write heads in hard disk drives.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a hard disk drive (HDD) 10 includes a hard disk assembly (HDA) 12 and a HDD printed circuit board (PCB) 14. The HDA 12 includes one or more circular platters 16, which have magnetic surfaces that are used to store data magnetically. Data is stored in binary form as a magnetic field of either positive or negative polarity. The platters 16 are arranged in a stack, and the stack is rotated by a spindle motor 18. At least one read/write head (hereinafter, "head") 20 reads data from and writes data on the magnetic surfaces of the platters 16.

Each head 20 includes a write element, such as an inductor, that generates a magnetic field and a read element, such as a magneto-resistive (MR) element, that senses the magnetic field on the platter 16. The head 20 is mounted at a distal end of an actuator arm 22. An actuator, such as a voice coil motor (VCM) 24, moves the actuator arm 22 relative to the platters 16.

The HDA 12 includes a preamplifier device 26 that amplifies signals received from and sent to the head 20. When writing data, the preamplifier device 26 generates a write current that flows through the write element of the head 20. The write current is switched to produce a positive or negative magnetic field on the magnetic surfaces of the platters 16. When reading data, the magnetic fields stored on the magnetic surfaces of the platters 16 induce low-level analog signals in the read element of the head 20. The preamplifier device 26 amplifies the low-level analog signals and outputs amplified analog signals to a read/write (R/W) channel (hereinafter, "read-channel") module 28.

The HDD PCB 14 includes the read-channel module 28, a hard disk controller (HDC) module 30, a processor 32, a spindle/VCM driver module 34, volatile memory 36, non-volatile memory 38, and an input/output (I/O) interface 40. During write operations, the read-channel module 28 may encode the data to increase reliability by using error-correcting codes (ECC) such as run length limited (RLL) code, Reed-Solomon code, etc. The read-channel module 28 then transmits the encoded data to the preamplifier device 26. During read operations, the read-channel module 28 receives analog signals from the preamplifier device 26. The read-channel module 28 converts the analog signals into digital signals, which are decoded to recover the original data.

The HDC module 30 controls operation of the HDD 10. For example, the HDC module 30 generates commands that control the speed of the spindle motor 18 and the movement of the actuator arm 22. The spindle/VCM driver module 34 implements the commands and generates control signals that control the speed of the spindle motor 18 and the positioning of the actuator arm 22. Additionally, the HDC module 30 communicates with an external device (not shown), such as a host adapter within a host device, via the I/O interface 40. The HDC module 30 may receive data to be stored from the external device, and may transmit retrieved data to the external device.

The processor 32 processes data, including encoding, decoding, filtering, and/or formatting. Additionally, the processor 32 processes servo or positioning information to position the heads 20 over the platters 16 during read/write operations. Servo, which is stored on the platters 16, ensures that data is written to and read from correct locations on the platters 16. In some implementations, a self-servo write (SSW) module 42 may write servo on the platters 16 using the heads 20 prior to storing data on the HDD 10.

SUMMARY

A system comprises a first filter module and a second filter module. The first filter module is configured to (i) pass a first DC shift in an input signal and (ii) convert a second DC shift in the input signal to a first component and a second component. The first DC shift is shorter in duration than the second DC shift. The second filter module is configured to detect one or more of (i) the first DC shift and (ii) the first component and the second component of the second DC shift. In response to detecting one or more of (i) the first DC shift and (ii) the first component and the second component of the second DC shift, the second filter module is configured to filter one or more of (i) the first DC shift and (ii) the first component and the second component of the second DC shift.

In other features, the system further comprises a third filter module configured to filter one or more of (i) the first DC shift and (ii) the first component and the second component of the second DC shift in response the second filter module failing to detecting one or more of the first DC shift and (ii) the first component and the second component of the second DC shift.

In other features, the system further comprises a decoder module configured to decode data from an output of the second filter module in response to one or more of (i) the first DC shift and (ii) the first component and the second component of the second DC shift being detected by the second filter module. The decoder module is configured to decode data from an output of the third filter module in response to one or more of (i) the first DC shift and the first component and second component of the second DC shift not being detected by the second filter module.

In other features, the first filter module is configured to generate a first output, and the second filter module or the third filter module is configured to detect one or more of (i) the first DC shift and (ii) the first component and the second component of the second DC shift by processing samples taken from the first output over a sliding window of a predetermined length.

In other features, the first filter module is configured to generate a first output, and the system further comprises an envelope detector module configured to detect an envelope of samples taken from the first output, and to detect one or more of (i) the first DC shift and (ii) the first component and the second component of the second DC shift in response to detecting a shift in the envelope in a direction away from a center of the envelope.

In other features, the system further comprises a Viterbi code-based processing module configured to generate an output indicative of presence or absence of one or more of (i) the first DC shift and (ii) the first component and the second component of the second DC shift in the samples taken from the first output.

In other features, the system further comprises a moving average filter module configured to generate a moving average of the samples taken from the first output, and to generate a correction term to correct one or more of (i) the first DC shift and (ii) the first component and the second component of the second DC shift based on the samples taken from the first output. The system further comprises a summing module configured to add the correction term to a portion of the samples taken from the first output to correct one or more of (i) the first DC shift and (ii) the first component and the second component of the second DC shift in response to one or more of (i) the first DC shift and (ii) the first component and the second component of the second DC shift being detected by one or more of (i) the moving average filter module, (ii) the envelope detector module, and (ii) the Viterbi code-based processing module.

In other features, the first filter module has a cutoff frequency, and the system further comprises a cutoff frequency control module configured to increase the cutoff frequency of the first filter module in response to the second DC shift being detected by the moving average filter module, the envelope detector module, or the Viterbi code-based processing module.

In other features, the first filter module has a cutoff frequency, and the system further comprises a cutoff frequency control module configured to increase the cutoff frequency of the first filter module in response to the second filter module detecting the second DC shift.

In other features, the first filter module is configured to generate a first output, and the system further comprises a moving average module configured to generate a moving average of samples taken from the first output, a removal module configured to remove the moving average from a portion of the samples in response to the moving average being greater than or equal to a predetermined threshold, and a decoding module configured to decode the samples subsequent to removing the moving average from the portion of the samples.

In other features, the system further comprises an erasure decoder module configured to mark as erasure an area of the input signal where the first DC shift or the second DC shift is detected, and to decode the area marked as erasure using erasure decoding.

In other features, at least one of the first filter module and the second filter module processes the input signal for a first time using a first criterion and for a second time using a second criterion to detect one or more of the first DC shift and the second DC shift.

In other features, at least one of the first filter module and the second filter module processes the input signal a plurality of times to detect one or more of the first DC shift and the second DC shift.

In still other features, a method comprises filtering an input signal using a first filter, and generating an output of the first filter including one or more of (i) a first DC shift and (ii) a first component and a second component of a second DC shift in the input signal. The first DC shift is shorter in duration than the second DC shift. The method further comprises detecting, using a second filter, one or more of (i) the first DC shift and (ii) the first component and the second component of the second DC shift. The method further comprises in response to detecting one or more of (i) the first DC shift and (ii) the first component and the second component of the second DC shift, filtering one or more of (i) the first DC shift and (ii) the first component and the second component of the second DC shift.

In other features, the method further comprises, using a third filter, filtering one or more of (i) the first DC shift and (ii) the first component and the second component of the second DC shift in response the second filter failing to detecting one or more of (i) the first DC shift and (ii) the first component and the second component of the second DC shift.

In other features, the method further comprises decoding data from an output of the second filter in response to one or more of (i) the first DC shift and (ii) the first component and the second component of the second DC shift being detected by the second filter. The method further comprises decoding data from an output of the third filter in response to one or more of (i) the first DC shift and (ii) the first component and the second component of the second DC shift not being detected by the second filter.

In other features, the method further comprises detecting an envelope of samples taken from the output of the first filter, and detecting one or more of (i) the first DC shift and (ii) the first component and the second component of the second DC shift in response to detecting a shift in the envelope in a direction away from a center of the envelope.

In other features, the method further comprises generating a moving average of samples taken from the output of the first filter, and generating a correction term to correct one or more of (i) the first DC shift and (ii) the first component and the second component of the second DC shift based on the samples taken from the output of the first filter. The method further comprises adding the correction term to a portion of the samples taken from the output of the first filter to correct one or more of (i) the first DC shift and (ii) the first component and the second component of the second DC shift in response to one or more of (i) the first DC shift and (ii) the first component and the second component of the second DC shift being detected.

In other features, the first filter has a cutoff frequency, and the method further comprises increasing the cutoff frequency of the first filter in response to the second filter detecting the second DC shift.

In other features, the method further comprises generating a moving average of samples taken from the output of the first filter, removing the moving average from a portion of the samples in response to the moving average being greater than or equal to a predetermined threshold, and decoding the samples subsequent to removing the moving average from the portion of the samples.

Further areas of applicability of the present disclosure will become apparent from the detailed description, the claims and the drawings. The detailed description and specific examples are intended for purposes of illustration only and are not intended to limit the scope of the disclosure.

DESCRIPTION

In hard disk drives, an unstable read/write head may cause a DC shift in a waveform generated by the read/write head. The DC shift can be characterized by two parameters: a shift value (i.e., a magnitude of the DC shift) and a defect duration (i.e., a duration of the DC shift). The present disclosure relates to detecting and correcting the DC shift.

Figure 1:
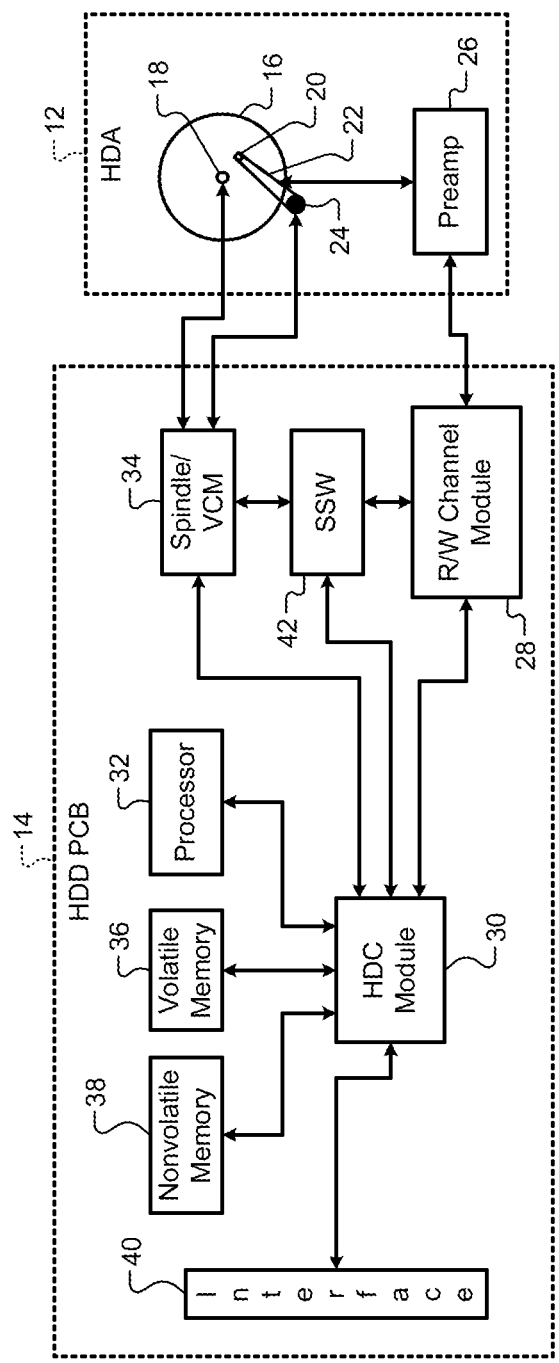
FIG. 1 is a functional block diagram of a hard disk drive according to the prior art.
Figure 2:
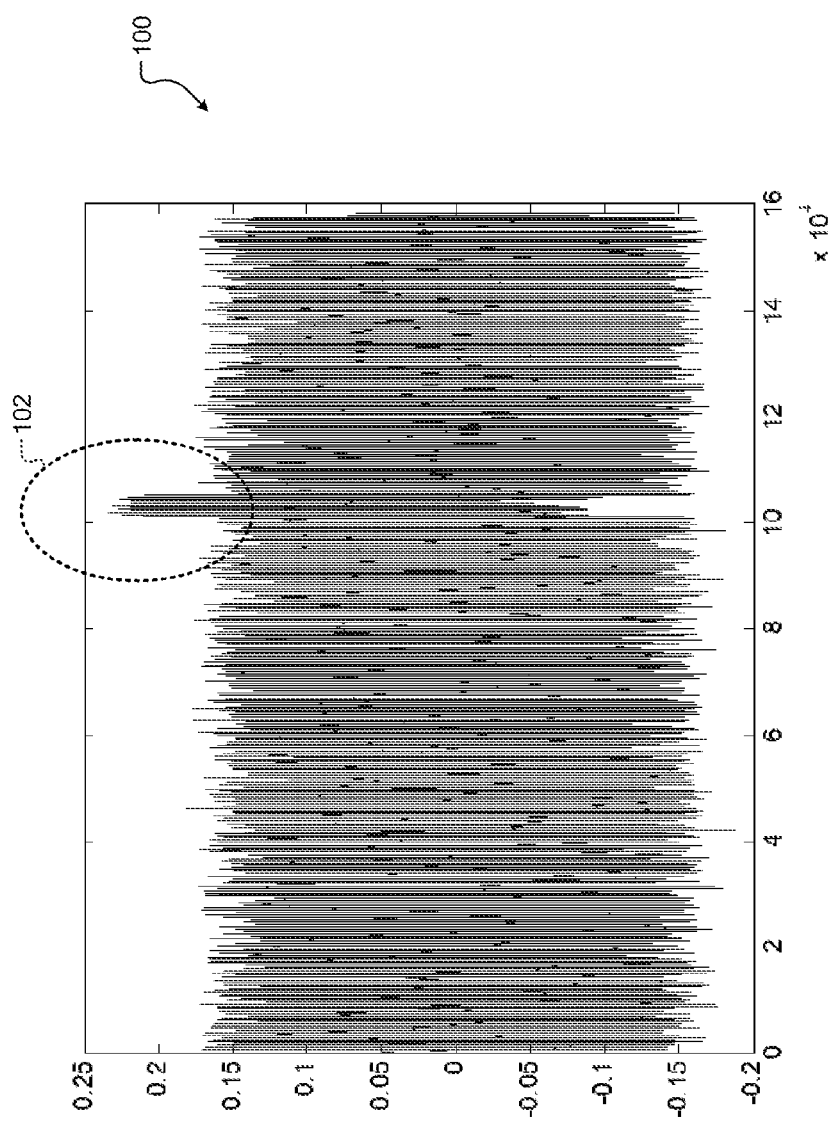
FIG. 2 depicts a signal generated by a read/write head of a hard disk drive according to the present disclosure.

Referring now to FIG. 2, a waveform 100 generated by a read/write head of a hard disk drive is shown. Due to instability of the read/write head, a DC shift 102 occurs in the waveform 100. While the DC shift is shown to occur in the positive direction, the DC shift can also occur in the negative direction.

Figure 3:
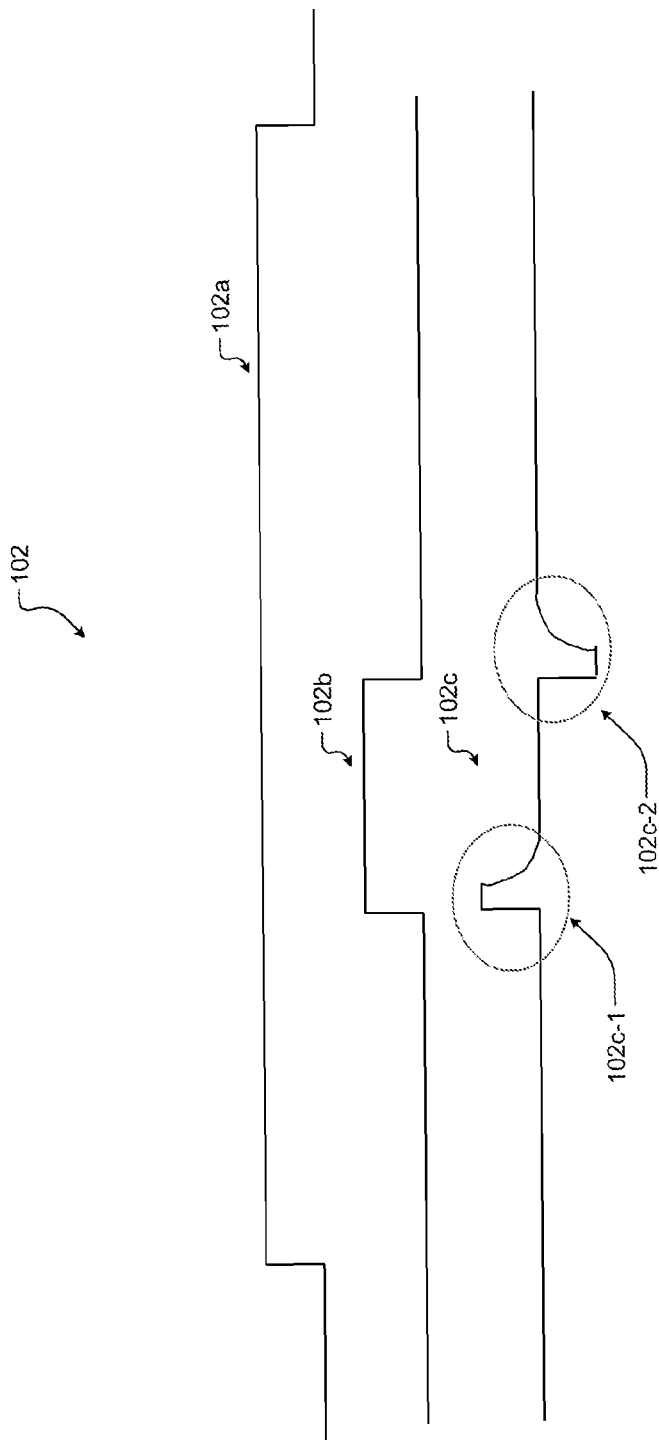
FIG. 3 depicts a DC shift in a signal generated by a read/write head of a hard disk drive according to the present disclosure.

Referring now to FIG. 3, an example of the DC shift 102 is shown. Using the systems and methods described below, the DC shift 102 can be mitigated as shown. Specifically, a read-channel gating signal, during which a read channel module processes a signal received from a read/write head, is shown at 102*a*. A DC profile of the original DC shift 102 is shown at 102*b*. A mitigated DC shift 102 is shown at 102*c*.

More specifically, as explained below, a high pass filter module converts a DC shift of a long duration (shown at 102*b* in FIG. 3) into an overshoot component and an undershoot component (shown respectively at 102*c*-I and 102*c*-2 in FIG. 3). The overshoot and undershoot components are detected and filtered by a MAFIR module shown in FIG. 11 according to the present disclosure. If the MAFIR module does not detect the overshoot and undershoot components, the overshoot and undershoot components are filtered by a FDC module shown in FIG. 11. Additionally, a DC shift of a short duration may pass through the high pass filter module. The MAFIR module may detect and filter the DC shift of a short duration. If the MAFIR module does not detect and filter the DC shift of a short duration, the FDC module filters the DC shift of a short duration.

Figure 4:
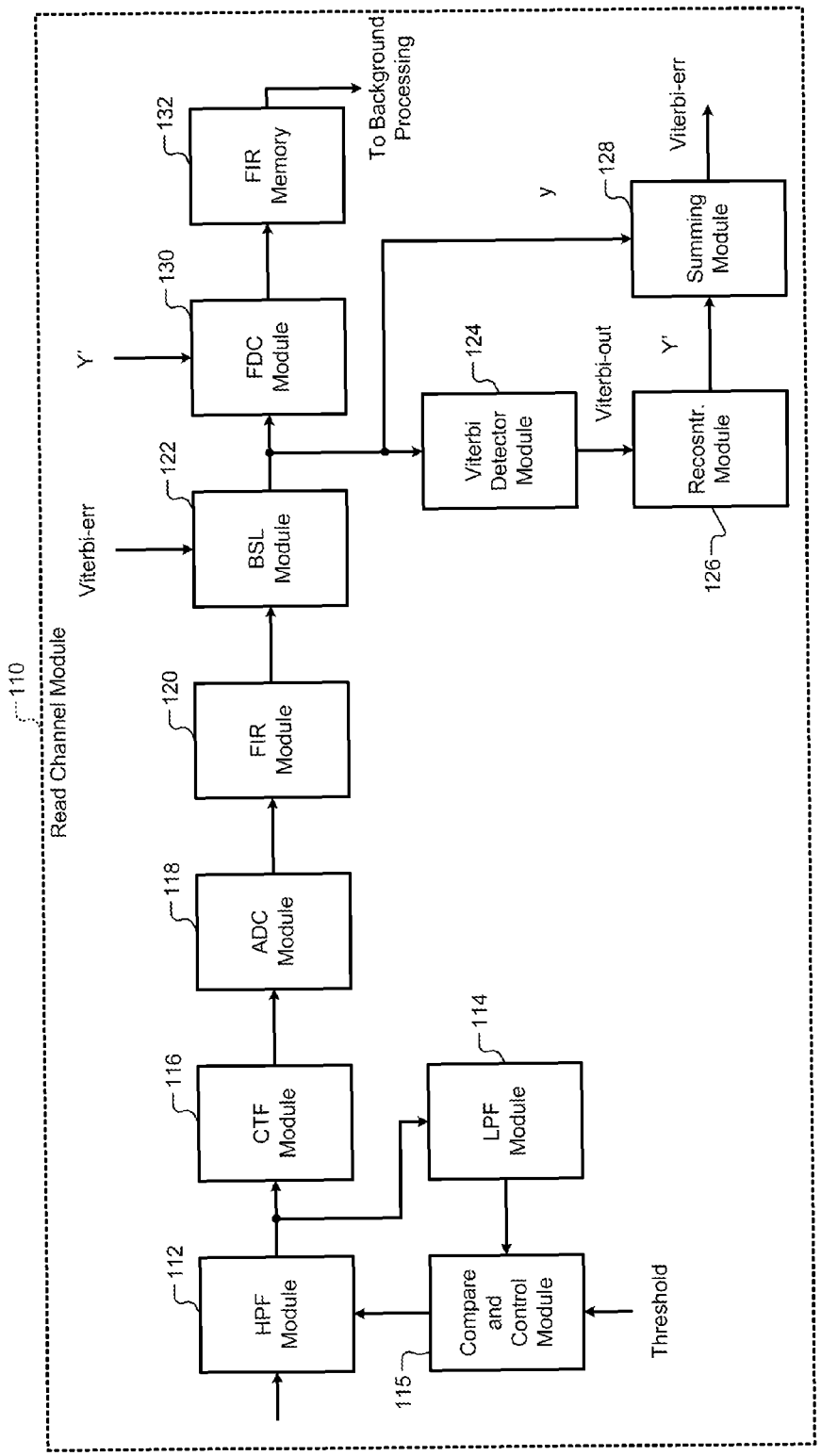
FIG. 4 is a functional block diagram of a read channel module of a hard disk drive according to the present disclosure.

Referring now to FIG. 4, a read channel module 110 detects and corrects a DC shift in a signal received from a read/write head as follows. The read channel module 110 includes a high-pass filter (HPF) module 112, a low-pass filter (LPF) module 114, a compare and control module 115, a continuous time filter (CTF) module 116, an analog-to-digital converter (ADC) module 118, a finite impulse response (FIR) filter module 120, a baseline correction (BSL) module 122, a Viterbi detector module 124, a reconstruction module 126, a summing (or a subtraction) module 128, a fast DC correction (FDC) module 130, and a FIR memory module 132.

Figure 5:
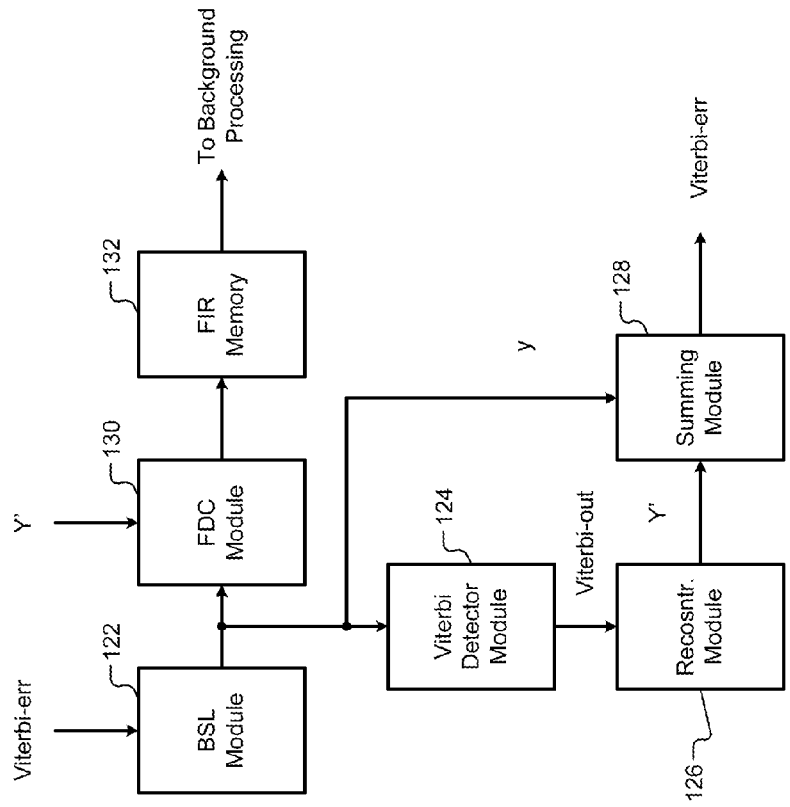
FIG. 5 is a functional block diagram of a system to detect a DC shift in a signal generated by a read/write head of a hard disk drive using a Viterbi detector according to the present disclosure.
Figure 6:
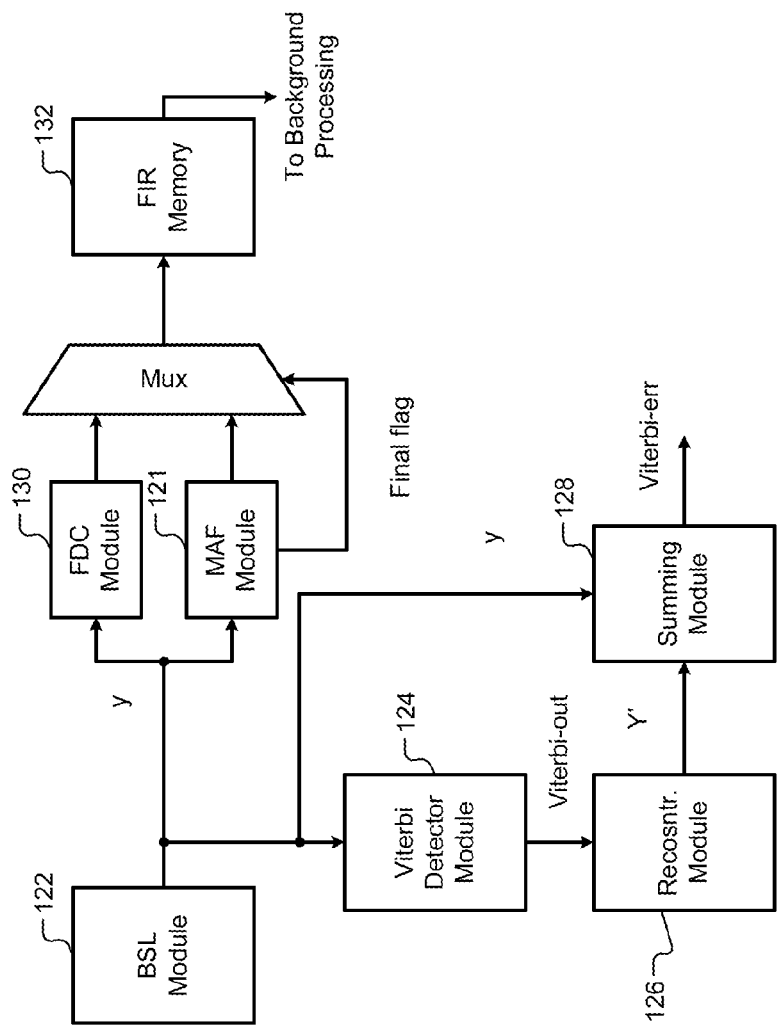
FIG. 6 is a functional block diagram of a system to detect a DC shift in a signal generated by a read/write head of a hard disk drive using moving average filters according to the present disclosure.
Figure 11:
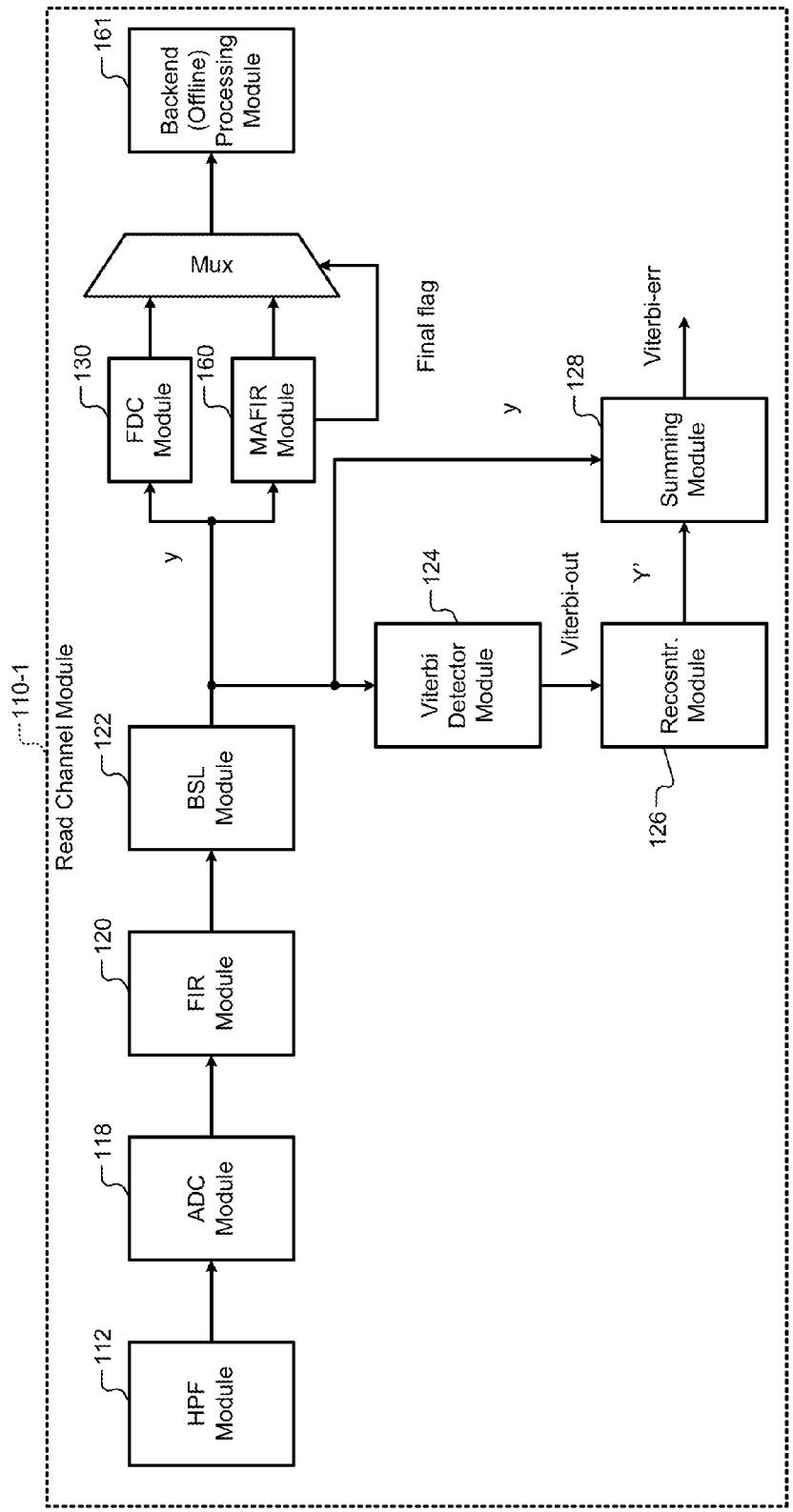
FIG. 11 is a functional block diagram of a read channel module of a hard disk drive that detects and corrects a DC shift in a signal generated by a read/write head of a hard disk drive according to the present disclosure.

In FIG. 4, and in FIGS. 5, 6, and 11 to follow, the Viterbi detector module 124, the reconstruction module 126, and the summing (or the subtraction) module 128 can be called a Viterbi code-based processing module.

The high-pass filter module 112 filters out low-frequency components from the signal output by the read/write head. The amount of low-frequency components filtered out by the high-pass filter module 112 depends on a cutoff frequency of the high-pass filter module 112. By increasing the cutoff frequency of the high-pass filter module 112, additional low-frequency components can be filtered out from the signal received from the read/write head.

An output of the high-pass filter module 112 is input to the low-pass filter module 114. An output of the low-pass filter module 114, which is a DC component, is input to the compare and control module 115. Accordingly, a combination of the low-pass filter module 114 and the compare and control module 115 may be called a DC detector module.

The compare and control module 115 compares a level of the low-frequency components in the output of the high-pass filter module 112 to a predetermined threshold. If the level of the low-frequency components in the output of the high-pass filter module 112 is greater than or equal to the predetermined threshold, the compare and control module 115 increases the cutoff frequency of the high-pass filter module 112 to reduce the level of the low-frequency components in the output of the high-pass filter module 112.

In the case when the level of the low-frequency components is high, the compare and control module 115 may turn off timing and gain adaptation loops of the read channel module 110 (not shown). In addition, the compare and control module 115 may mark (i.e., flag) the noisy area of the signal as erasure for subsequent backend processing and correction.

The CTF module 116 filters out some of the high frequency component. The ADC module 118 converts the signal from an analog domain to a digital domain. The FIR filter module 120 filters the output of the ADC module 118. The baseline correction module 122 eliminates the DC component from the output of the FIR filter module 120 based on a Viterbi error signal Viterbi_err generated as explained below. The fast DC correction module 130 applies a further DC correction to the output of the baseline correction module 122 based on a reconstructed signal y' generated as explained below.

The output of the baseline correction module 122 is input to the Viterbi detector module 124. The Viterbi detector module 124 outputs a hard decision Viterbi_out. The reconstruction module 126 generates a reconstructed signal y' based on the hard decision Viterbi_out. The summing module 128 generates the Viterbi error signal Viterbi_err based on the output y of the baseline correction module 122 and the output y' of the reconstruction module 126. The Viterbi error signal Viterbi_err is fed back to the baseline correction module 122. The reconstructed signal y' is fed back to the fast DC correction module 130. The output of the fast DC correction module 130 is stored in the FIR memory module 132 and is processed in background (i.e., not on-the-fly) to correct the DC shift.

The low-pass filter module 114 is effective when the DC shift is severe. The baseline correction module 122 and the fast DC correction module 130 are driven by signals derived from the output of the Viterbi detector module 124. When the DC shift is present, the output of the Viterbi detector module 124 includes more errors, which affect the performance of the baseline correction module 122 and the fast DC correction module 130.

Specifically, the Viterbi error signal Viterbi_err represents noise. If the hard decision Viterbi_out of the Viterbi detector module 124 is correct, the Viterbi error signal Viterbi_err accurately represents noise. Conversely, if the hard decision Viterbi_out of the Viterbi detector module 124 is incorrect, the Viterbi error signal Viterbi_err does not represent the noise accurately. Accordingly, if the DC shift causes unacceptable amount of errors in the signal input to the Viterbi detector module 124, the hard decision Viterbi_out of the Viterbi detector module 124 will be incorrect, and the Viterbi error signal Viterbi_err will not represent the noise accurately. Consequently, the performance of the baseline correction module 122 and a fast DC correction module 130 will degrade.

The DC shift can be effectively corrected in many ways. For example, a plurality of cutoff frequencies can be provided for the high-pass filter module 112, and the cutoff frequencies can be changed when the DC shift is detected according to the magnitude and/or the duration of the DC shift. Alternatively or additionally, using a sliding window, a moving average of the output of the baseline correction module 122 can be calculated, and the moving average can be removed from the samples if the moving average exceeds a predetermined threshold.

The DC shift can also be effectively corrected using one or more off-line processing schemes. For example, based on flags raised during detection of the DC shift, corresponding positions of the signal can be erased for backend processing. Alternatively, data in the FIR memory module 132 can be processed in a retry mode using different algorithms or parameters. In some implementations, the same data can be reread multiple times if the DC shift occurs randomly (i.e., in different locations in the signal), so that the DC shift can be detected and removed by off-line analysis.

Before correcting the DC shift, the DC shift has to be correctly detected. The DC shift can be correctly detected using different methods. Some methods for correctly detecting the DC shift are described below.

Referring now to FIG. 5, the DC shift can be correctly detected as follows. The Viterbi error signal Viterbi_err can correctly indicate the DC shift. If the hard decision produced by the Viterbi detector module 124 is correct, the Viterbi error signal Viterbi_err generated over a sliding window represents noise. The sum of the noise in the sliding window is close to zero if the window size is relatively long and if the noise is random. The DC shift will remain in the Viterbi error signal Viterbi_err if the hard decision produced by the Viterbi detector module 124 is correct. The sum of the noise in the defective area of the signal will include the DC shift and will therefore be detected. An erasure flag is generated if the Viterbi_err in the sliding window exceeds a predetermined threshold. The erasure flag can be used to correct the DC shift in backend processing.

Referring now to FIG. 6, the DC shift can be correctly detected by taking a moving average of the output of the baseline correction module 122. For example, a moving average filter module 121 can generate a moving average of the output of the baseline correction module 122 over a sliding window.

Assuming that noise in a relatively long sliding window is random, the moving average of the output of the baseline correction module 122 without the DC shift should be close to zero. When the DC shift is present, the moving average of the output of the baseline correction module 122 in the defective areas will include the DC shift. When the moving average exceeds a predetermined threshold, the DC shift is detected. False alarms can be reduced by increasing the length of the sliding window and/or the predetermined threshold. An erasure flag is generated if the moving average in the sliding window exceeds the predetermined threshold. The erasure flag can be used to correct the DC shift in backend processing.

Figure 7A:
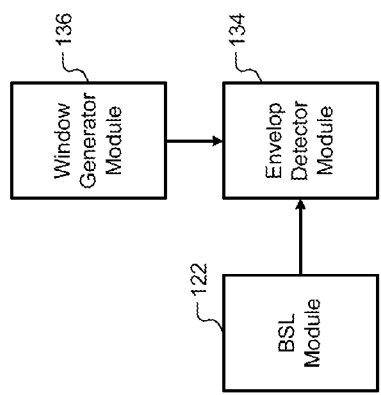
FIGS. 7A and 7B is a functional block diagram of a system to detect a DC shift in a signal generated by a read/write head of a hard disk drive using an envelope detector according to the present disclosure.
Figure 7B:
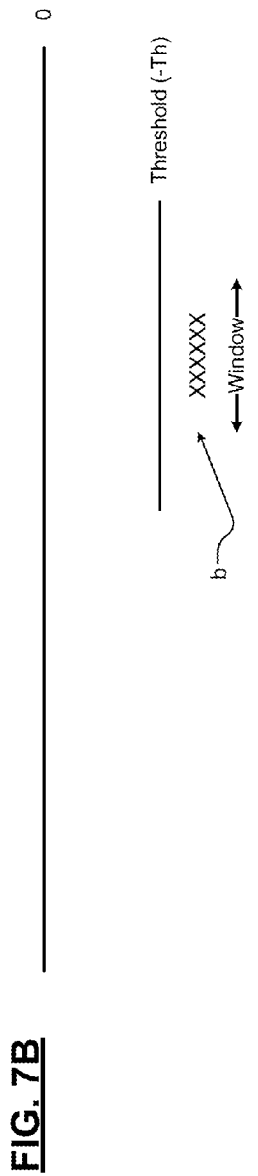

Referring now to FIGS. 7A and 7B, the DC shift can be detected using an envelope detector module 134 as follows. In FIG. 7A, the envelope detector module 134 detects an envelope of samples in the output of the baseline correction module 122 over a sliding window generated by a window generator module 136. In FIG. 7B, if the samples in the sliding window include a DC shift, the DC shift causes the envelope to shift in the direction of the DC shift (e.g., up if the DC shift is positive or down if the DC shift is negative).

The envelope detector module 134 counts the number of samples (say a) above a first threshold (say +Th) and the number of samples (say b) below a second threshold (say −Th). If the DC shift is positive, the envelope will shift in the positive direction, and the number a will be greater than the number b. Conversely, if the DC shift is negative, the envelope will shift in the negative direction and the number b will be greater than the number a.

The envelope detector module 134 generates an absolute value of a difference between a and b. The detector envelope module 134 compares the absolute value to a predetermined threshold. The envelope detector module 134 detects the DC shift if the absolute value exceeds the predetermined threshold. An erasure flag is generated if the absolute value in the sliding window exceeds the predetermined threshold. The erasure flag can be used to correct the DC shift in backend processing.

Figure 8:
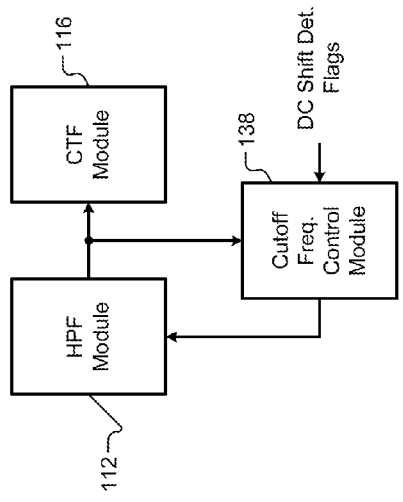
FIG. 8 is a functional block diagram of a system to correct a DC shift in a signal generated by a read/write head of a hard disk drive using a high-pass filter having a plurality of selectable cutoff frequencies according to the present disclosure.

Referring now to FIG. 8, the DC shift can be corrected using a high-pass filter module having multiple cutoff frequencies. A cutoff frequency control module 138 controls the cutoff frequency of the high-pass filter module 112. The higher the cutoff frequency of the high-pass filter module 112, the faster the DC shift can be removed. When the cutoff frequency of the high-pass filter module 112 is very high, however, some useful low-frequency signal is also filtered out, which degrades performance when no DC shift is present. Therefore, multiple cutoff frequencies can be used, and the cutoff frequencies can be switched (i.e., selected) in a controlled manner.

For example, the cutoff frequency control module 138 selects a cutoff frequency of the high-pass filter module 112 based on one or more flags generated during the detection of the DC shift. The cutoff frequency control module 138 may select a lower cutoff frequency for the high-pass filter module 112 when no DC shift is detected and may select a higher cutoff frequency for the high-pass filter module 112 when DC shift his present.

Figure 9A:
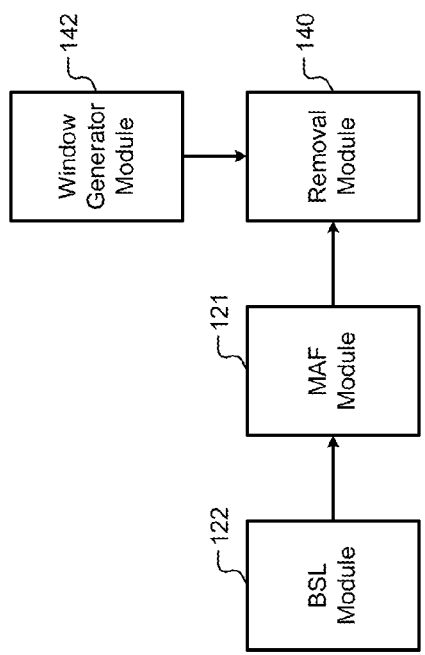
FIGS. 9A and 9B depict a system to correct a DC shift in a signal generated by a read/write head of a hard disk drive by computing a moving average in a sliding window and removing the moving average from the sliding window according to the present disclosure.
Figure 9B:
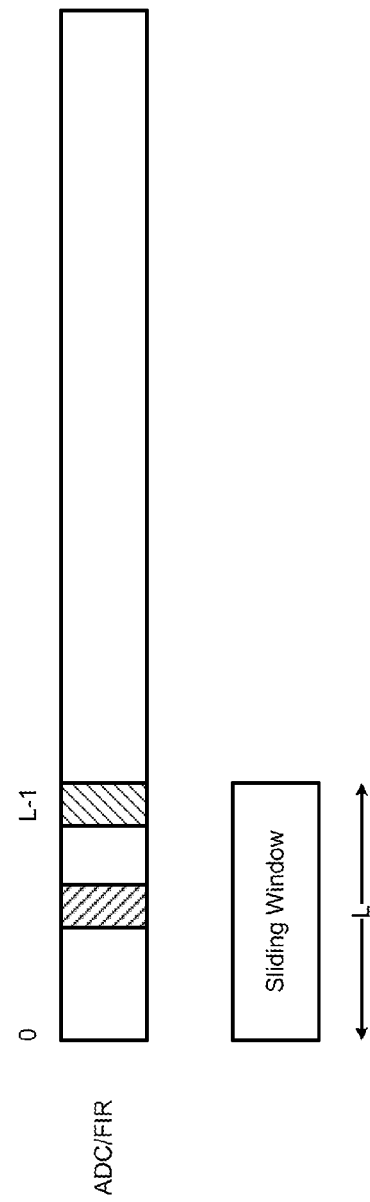

Referring now to FIGS. 9A and 9B, the DC shift can be corrected by computing a moving average in a sliding window and removing the moving average from the sliding window as follows. In FIG. 9A, a window generator module 142 generates a sliding window. The moving average filter module 121 generates a moving average of the samples output by the BSL module 122 in the sliding window. A removal module 140 removes the moving average from the sliding window if the DC shift is detected. For example, in FIG. 9B, the removal module 140 may remove the moving average from a center portion of the sliding window. In some implementations, the removal module 140 may remove the moving average from the last sample in the sliding window. The removal module 140 may remove the moving average from the sliding window in other ways.

Figure 10A:
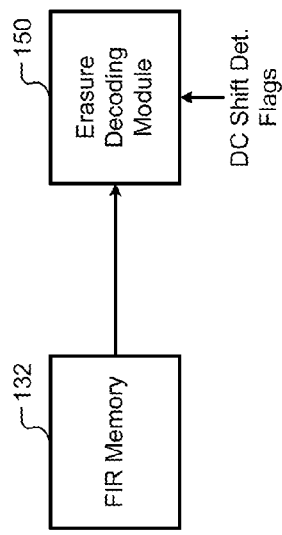
FIG. 10A depicts a system to correct a DC shift in a signal generated by a read/write head of a hard disk drive by using erasure decoding according to the present disclosure.

Referring now to FIG. 10A, the DC shift can be corrected using erasure decoding. An erasure decoding module 150 performs erasure decoding on FIR samples stored in the FIR memory module 132 based on the flags generated during DC shift detection. Based on the flags generated during DC shift detection, the defective areas of the signal can be erased. Subsequently, erasure decoding can be performed on the erased portion of the signal. If the number of errors in the defective areas is large, erasure will prevent the errors from propagating to other areas of the signal. A trade-off of erasure, however, is that good samples in the defective areas of the signal are also erased.

Figure 10B:
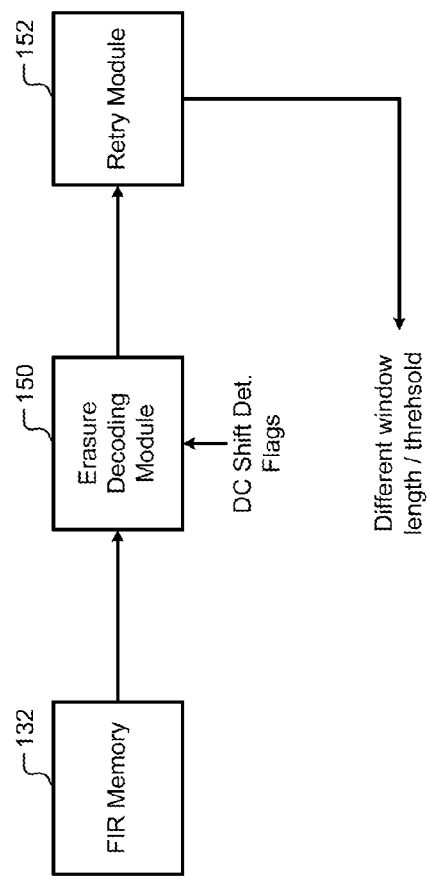
FIG. 10B depicts a system to correct a DC shift in a signal generated by a read/write head of a hard disk drive by using a retry mode according to the present disclosure.

Referring now to FIG. 10B, a retry mode may be used to detect and/or correct DC shift. For example, if reading a sector fails (i.e., if a codeword from a sector cannot be decoded as indicated by the erasure decoding module 150, for example), the FIR samples corresponding to the codewords that cannot be decoded are stored in the FIR memory module 132. In retry mode, one or more methods for detecting and correcting the DC shift described above can be retried with different parameters (e.g., with a different threshold, a different window length, and so on) generated by a retry module 154. For example, in the moving average method described above, at any given time, only one window length and one threshold can be used on the fly. However, in retry mode, during each retry, a different window length and/or threshold can be used. Decoding is attempted after each try. The number of retries required for successful decoding depends on the distribution of the DC shift in the signal.

In error recovery, the DC shift may not occur in the same location in the signal when a sector is reread multiple times. Consequently, one error recovery method may include carrying out multiple reads and employing moving averages of the FIR samples to effectively remove the DC shift. For example, if the DC shift occurs in different areas of the signal in three rereads, then for each defective area, two of the three rereads may provide acceptable FIR samples, and the defective area can be identified and replaced with good samples. In another example, the sector can be read N times, where N is an integer greater than 1, and the FIR samples for the N reads can be averaged out.

Referring now to FIG. 11, a read channel module 110-1 is shown. The read channel module 110-1 detects and corrects the DC shift in a signal received from the read/write head as follows. The high-pass filter module 112 mitigates long DC shifts, and a moving average FIR (MAFIR) filter module 160 mitigates short DC shifts and cleans up residual offsets from the output of the high-pass filter module 112.

More specifically, the high pass filter module 112 converts a DC shift of a long duration (shown at 102b in FIG. 3) into an overshoot component and an undershoot component (shown respectively at 102c-1 and 102c-2 in FIG. 3). The overshoot and undershoot components are detected and filtered by the MAFIR module 160. If the MAFIR module 160 does not detect the overshoot and undershoot components, the overshoot and undershoot components are filtered by the FDC module 130. Additionally, a DC shift of a short duration may pass through the high pass filter module 112. The MAFIR module 160 may detect and filter the DC shift of a short duration. If the MAFIR module 160 does not detect and filter the DC shift of a short duration, the FDC module 130 filters the DC shift of a short duration.

As explained below, the MAFIR filter module 160 generates a DC correction term to correct the DC shift (short DC shift and/or residual overshoots of long DC shift) and corrects the DC shift using the DC correction term if the DC shift is detected. Additionally, the MAFIR filter module 160 generates a final flag that indicates whether a backend processing module 161 may decode data using the output of the MAFIR filter module 160 or the output of the fast DC correction module 130.

Figure 12:
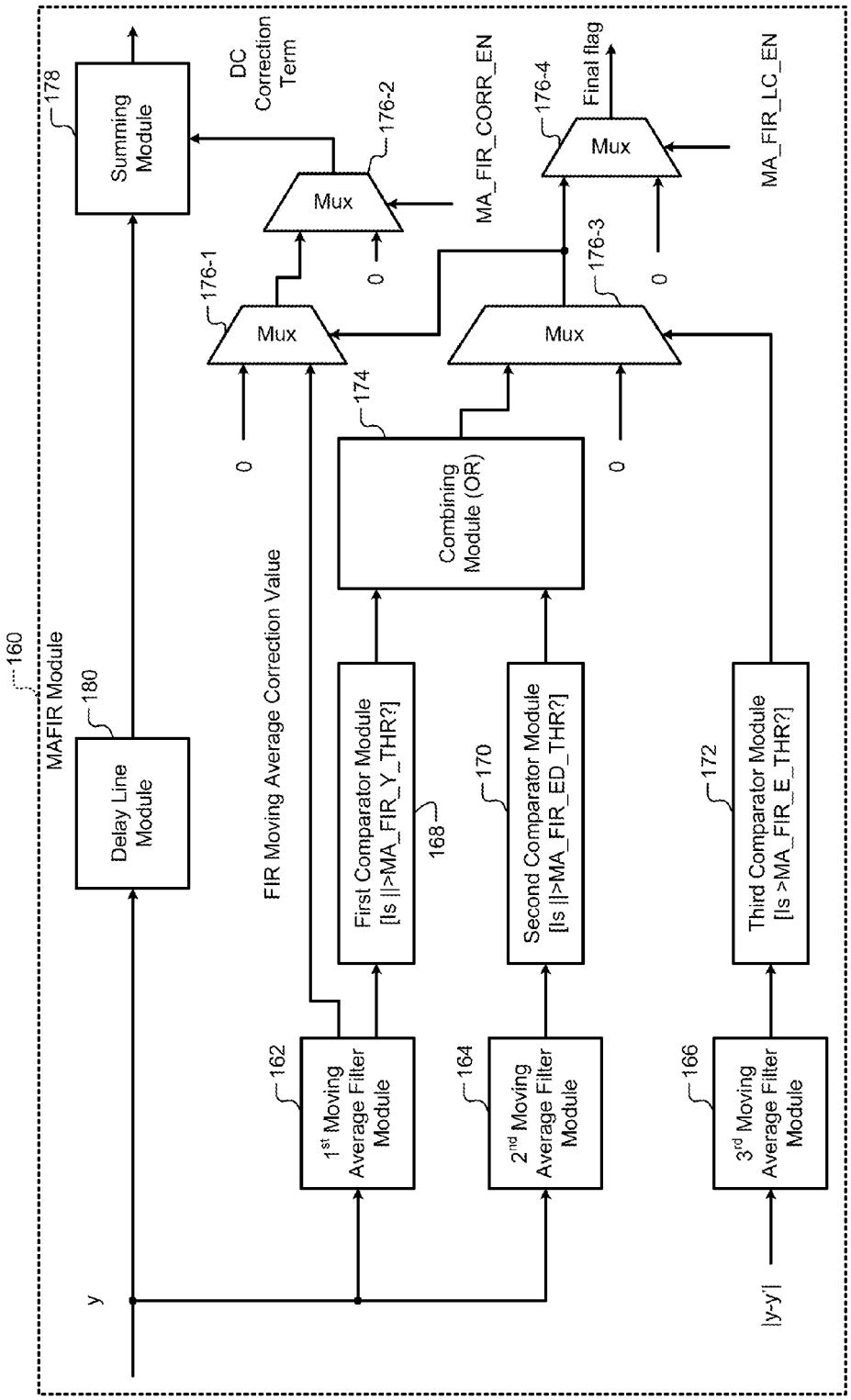
FIG. 12 is a functional block diagram of a moving average FIR filter used in the read channel module of FIG. 11.

Referring now to FIG. 12, the MAFIR filter module 160 is shown in detail. The MAFIR filter module 160 includes a first moving average filter module 162, a second moving average filter module 164, and a third moving average filter module 166. The first moving average filter module 162 generates a moving average of the output y of the baseline correction module 122 over a sliding window of a predetermined length and generates a DC correction term to correct the DC shift. It also generates a DC detection flag serving as one of the indicators of the presence of the DC shift. The second moving average filter module 164 generates a moving average of an envelope detector as explained with reference to FIGS. 7A and 7B. The third moving average filter module 166 generates a moving average of the output Viterbi_err over a sliding window of a predetermined length.

The MAFIR filter module 160 further includes a first comparator module 168, a second comparator module 170, and a third comparator module 172. The first comparator module 168 compares an absolute value of the output of the first moving average filter module 162 to a first threshold (MA_FIR_Y_THR). The second comparator module 170 compares an absolute value of the output of the second moving average filter module 164 to a second threshold (MA_FIR_ED_THR). The third comparator module 172 compares an absolute value of the output of the third moving average filter module 166 to a third threshold (MA_FIR_E_THR). The outputs of the first, second, and third comparator modules 162, 164, 166 indicate whether a DC shift is detected based on the output y, the envelope detector, and the Viterbi-err.

The MAFIR filter module 160 further includes a combining module 174; a plurality of multiplexer 176-1, 176-2, 176-3, and 176-4; a summing module 178; and a delay line module 180. The combining module 174 combines (performs an OR operation on) the outputs of the first comparator module 168 and the second comparator module 170. The multiplexers 176-3, 176-4 multiplex the outputs of the combining module 174 and the third comparator module 172 to generate a final flag indicating whether the DC shift is detected. The multiplexers 176-1, 176-2, and 176-3 provide the output of the first moving average filter module 162 as the DC correction term to the summing module 178 if the DC shift is detected as indicated by the outputs of the first, second, or the third comparator modules 168,170,172.

The delay line module 180 delays the output y and provides a delayed output y to the summing module 178. For example, if the length of the sliding window is 64 samples, the delay line module 180 delays the output y by 32 samples. Accordingly, the summing module 178 applies the DC correction term to a center portion of the sliding window to correct the DC shift.

In FIG. 11, if the final flag indicates that the DC shift is detected, the corrected output of the MAFIR filter module 160 is used by the backend processing module 161 to decode data. If the final flag indicates that the DC shift is not detected, the corrected output of the MAFIR filter module 160 is not used by the backend processing module 161 to decode data. Instead, the output of the fast DC correction module 130 is used by the backend processing module 161 to decode data. The fast DC correction module 130 and the MAFIR filter module 160 use sliding windows having the same length. The parallel arrangement of the fast DC correction module 130 and the MAFIR filter module 160 reduces latency.

Figure 13:
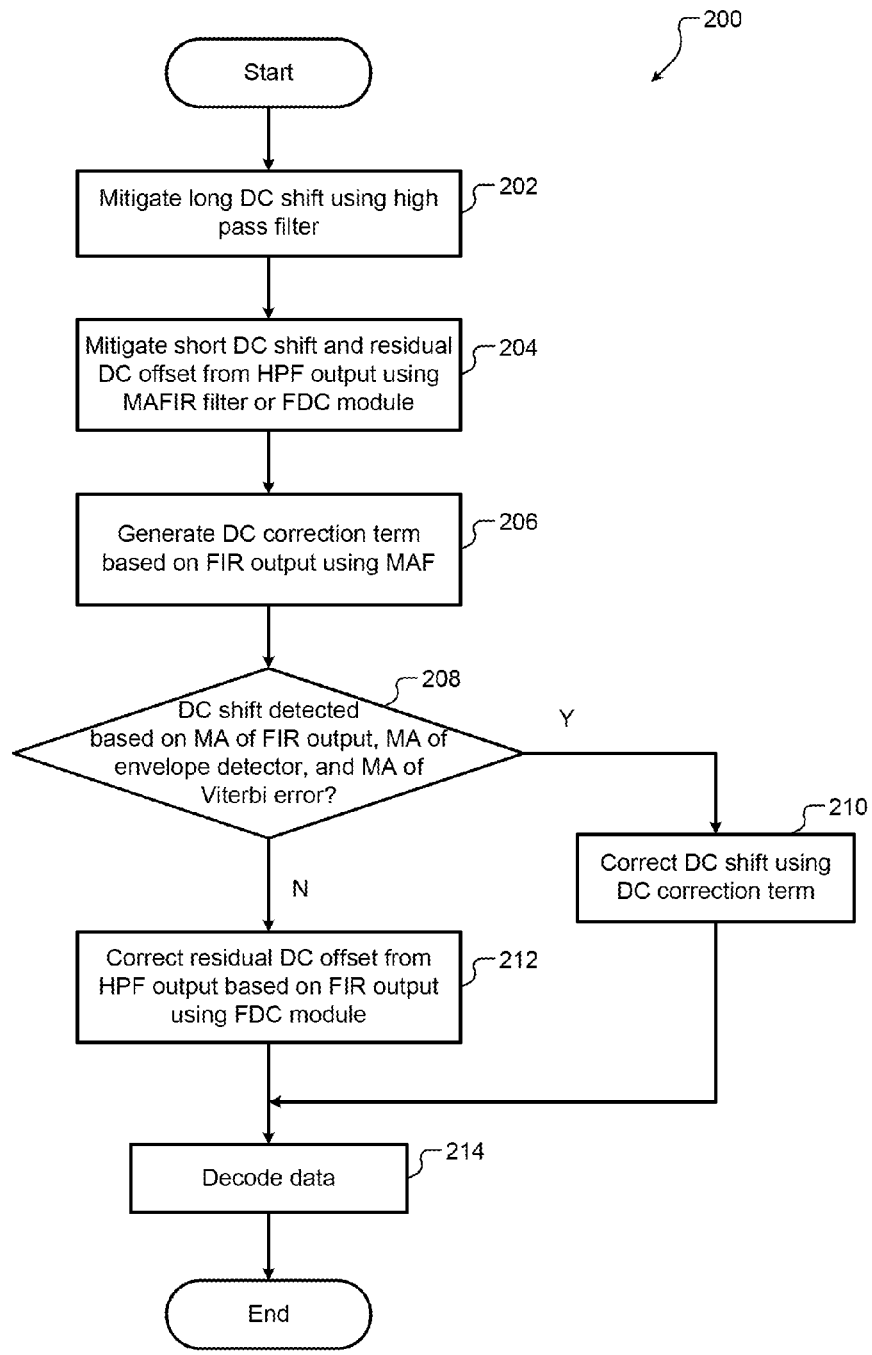
FIG. 13 is a flowchart of a method for detecting and correcting a DC shift in a signal generated by a read/write head of a hard disk drive according to the present disclosure.

Referring now to FIG. 13, a method 200 for mitigating the DC shift is shown. At 202, control mitigates long DC shift using the high-pass filter module 112. At 204, control mitigates short DC shift and residual DC offset from the output of the high-pass filter module 112 using the MAFIR filter module 160 or the fast DC correction module 130. At 206, control generates a DC correction term based on the FIR output using a moving average filter. At 208, control determines whether a DC shift is detected based on a moving average of the FIR output, a moving average of the envelope detector, and a moving average of the Viterbi_err. At 210, if the DC shift is detected, control corrects the DC shift using the DC correction term. At 212, if the DC shift is not detected, control corrects the residual DC offset from the output of the high-pass filter module 112 based on the FIR output using the fast DC correction module 130. At 214, control decodes data from the output of the MAFIR filter module 160 if the DC shift is detected or from the output of the fast DC correction module 130 if the DC shift is not detected.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
   a first filter module configured to
      receive an input signal including (i) a first shift in a DC level of the input signal and (ii) a second shift in the DC level of the input signal, wherein the first shift has (i) a first magnitude and (ii) a first duration, wherein the second shift has (i) a second magnitude and (ii) a second duration, wherein the second magnitude is different than the first magnitude, and wherein the second duration is greater than the first duration; and
      pass the first shift in the DC level of the input signal; and
   a second filter module configured to
      detect one or more of (i) the first shift and (ii) the second shift; and
      in response to detecting one or more of (i) the first shift and (ii) the second shift, filter one or more of (i) the first shift and (ii) the second shift.

2. The system of claim 1, wherein:
   the first filter module is configured to convert the second shift in the DC level of the input signal into (i) a first component and (ii) a second component; and
   the second filter module is configured to
      detect one or more of (i) the first component and (ii) the second component, and
      in response to detecting one or more of (i) the first component and (ii) the second component, filter one or more of (i) the first component and (ii) the second component.

3. The system of claim 1, further comprising a third filter module configured to filter one or more of (i) the first shift and (ii) the second shift in response the second filter module failing to detect one or more of (i) the first shift and (ii) the second shift.

4. The system of claim 3, further comprising a decoding module configured to:
   decode data from an output of the second filter module in response to one or more of (i) the first shift and (ii) the second shift being detected by the second filter module; and decode data from an output of the third filter module in response to one or more of (i) the first shift and (ii) the second shift not being detected by the second filter module.

5. The system of claim 4, wherein:
the first filter module is configured to generate a first output; and
the second filter module or the third filter module is configured to detect one or more of (i) the first shift and (ii) the second shift by processing samples taken from the first output over a sliding window of a predetermined length.

6. The system of claim 1, wherein the first filter module is configured to generate a first output, the system further comprising an envelope detector module configured to:
detect an envelope of samples taken from the first output, and
detect one or more of (i) the first shift and (ii) the second shift in response to detecting a shift in the envelope in a direction away from a center of the envelope.

7. The system of claim 6, further comprising a processing module configured to generate an output indicating presence or absence of one or more of (i) the first shift and (ii) the second shift in the samples taken from the first output.

8. The system of claim 7, further comprising:
a moving average filter module configured to generate a moving average of the samples taken from the first output, and generate a correction term to correct one or more of (i) the first shift and (ii) the second shift based on the samples taken from the first output; and
a summing module configured to add the correction term to a portion of the samples taken from the first output to correct one or more of (i) the first shift and (ii) the second shift in response to one or more of (i) the first shift and (ii) the second shift being detected by one or more of (i) the moving average filter module, (ii) the envelope detector module, and (ii) the processing module.

9. The system of claim 8, wherein the first filter module has a cutoff frequency, the system further comprising a cutoff frequency control module configured to increase the cutoff frequency of the first filter module in response to the second shift being detected by the moving average filter module, the envelope detector module, or the processing module.

10. The system of claim 1, wherein the first filter module has a cutoff frequency, the system further comprising a cutoff frequency control module configured to increase the cutoff frequency of the first filter module in response to the second filter module detecting the second shift.

11. The system of claim 1, wherein the first filter module is configured to generate a first output, the system further comprising:
a moving average module configured to generate a moving average of samples taken from the first output;
a removal module configured to remove the moving average from a portion of the samples in response to the moving average being greater than or equal to a predetermined threshold; and
a decoding module configured to decode the samples subsequent to removing the moving average from the portion of the samples.

12. The system of claim 1, further comprising an erasure decoder module configured to:
mark as erasure an area of the input signal where the first shift or the second shift is detected, and
decode the area marked as erasure using erasure decoding.

13. The system of claim 1, wherein at least one of the first filter module and the second filter module processes the input signal for a first time using a first criterion and for a second time using a second criterion to detect one or more of the first shift and the second shift.

14. A method, comprising:
receiving an input signal including (i) a first shift in a DC level of the input signal and (ii) a second shift in the DC level of the input signal, wherein the first shift has (i) a first magnitude and (ii) a first duration, wherein the second shift has (i) a second magnitude and (ii) a second duration, wherein the second magnitude is different than the first magnitude, and wherein the second duration is greater than the first duration;
filtering the input signal using a first filter and generating an output including one or more of (i) the first shift and (ii) the second shift; and
detecting, using a second filter, one or more of (i) the first shift and (ii) the second shift; and
in response to detecting one or more of (i) the first shift and (ii) the second shift, filtering one or more of (i) the first shift and (ii) the second shift.

15. The method of claim 14, further comprising filtering, using a third filter, one or more of (i) the first shift and (ii) the second shift in response the second filter failing to detecting one or more of (i) the first shift and (ii) the second shift.

16. The method of claim 15, further comprising:
decoding data from an output of the second filter in response to one or more of (i) the first shift and (ii) the second shift being detected by the second filter; and
decoding data from an output of the third filter in response to one or more of (i) the first shift and (ii) the second shift not being detected by the second filter.

17. The method of claim 14, further comprising:
detecting an envelope of samples taken from the output of the first filter; and
detecting one or more of (i) the first shift and (ii) the second shift in response to detecting a shift in the envelope in a direction away from a center of the envelope.

18. The method of claim 14, further comprising:
generating a moving average of samples taken from the output of the first filter;
generating a correction term to correct one or more of (i) the first shift and (ii) the second shift based on the samples taken from the output of the first filter; and
adding the correction term to a portion of the samples taken from the output of the first filter to correct one or more of (i) the first shift and (ii) the second shift in response to one or more of (i) the first shift and (ii) the second shift being detected.

19. The method of claim 14, wherein the first filter has a cutoff frequency, the method further comprising increasing the cutoff frequency of the first filter in response to the second filter detecting the second shift.

20. The method of claim 14, further comprising:
generating a moving average of samples taken from the output of the first filter;
removing the moving average from a portion of the samples in response to the moving average being greater than or equal to a predetermined threshold; and
decoding the samples subsequent to removing the moving average from the portion of the samples.

* * * * *